March 30, 1965  N. A. NELSON  3,175,403
CONTINUOUSLY DETERMINING THE DENSITY OF A FLOW STREAM
Filed Nov. 14, 1961
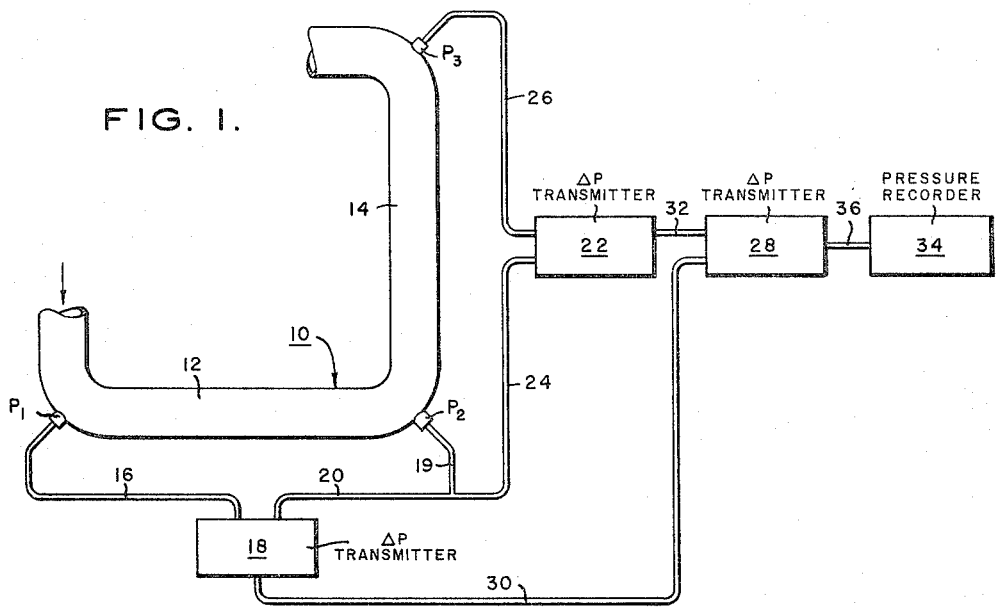
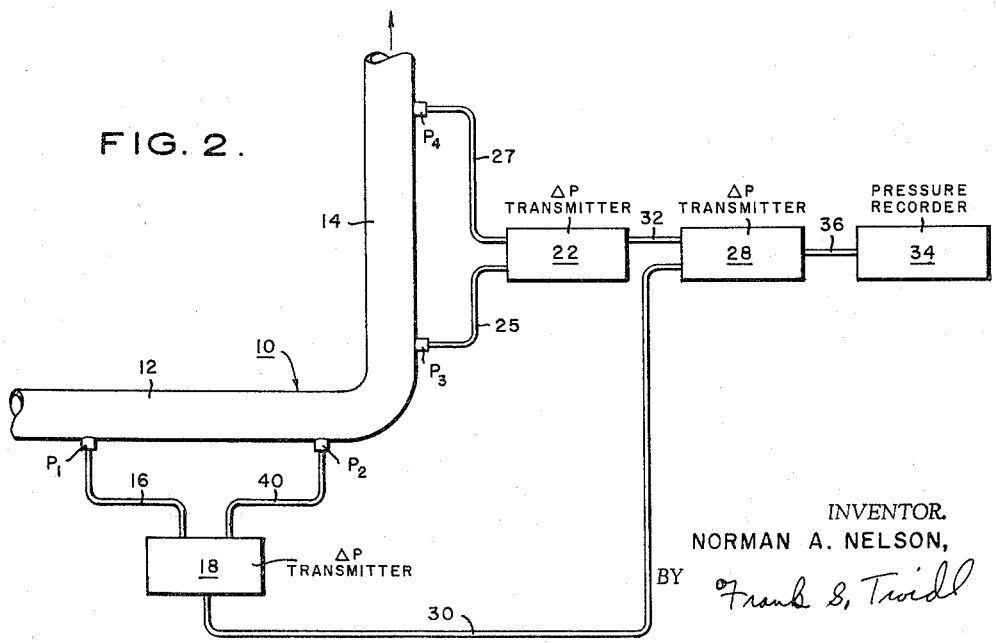
INVENTOR.
NORMAN A. NELSON,
BY Frank S. Troidl
ATTORNEY.

United States Patent Office 3,175,403
Patented Mar. 30, 1965

3,175,403
CONTINUOUSLY DETERMINING THE DENSITY
OF A FLOW STREAM
Norman A. Nelson, South Houston, Tex., assignor, by mesne assignments, to Jersey Production Research Company, Tulsa, Okla., a corporation of Delaware
Filed Nov. 14, 1961, Ser. No. 152,195
1 Claim. (Cl. 73—438)

This invention is an apparatus for continuously determining the density of a flow stream regardless of the rate of flow.

Often it is desirable to obtain a continuous indication of the density of a flowing stream regardless of the flow rate. For example, in oil production wherein an oil-water flow stream is flowed through a pipeline, it is desirable to obtain a continuous indication of the density of the stream. The density of the flowing stream will vary in accordance with temperature and the relative proportions of oil and water in the flow stream.

This invention provides a means for automatically and continuously determining the bottom sediment and water content of an oil-water flow stream. This invention could be linked to the meter measuring the flow stream volume through a pipeline to compensate the meter reading for bottom sediment and water and give a net oil volume reading.

The invention, as well as its many advantages, will be understood by reference to the following detailed description and drawings wherein:

FIG. 1 is a schematic diagram illustrating my apparatus; and

FIG. 2 is a schematic diagram of another embodiment of my apparatus.

Referring to FIG. 1, the fluid is flowed through a conduit or pipe indicated generally by the numeral 10. Conduit 10 includes a horizontal section 12 followed by a vertical section 14. The sections 12 and 14 are symmetrical and of the same dimensions, having the same length and cross-sectional area.

By measuring the pressure at each end of each of the identical sections 12 and 14, it is possible to determine the head of the fluid regardless of the flow rate. Basically this problem consists of canceling out the effect of pressure drop due to flow which would be the same in both the horizontal section 12 and the vertical section 14. With the two sections directly connected so that the downstream end of the horizontal section 12 connects directly to the upstream end of the vertical section 14, the following relationships can be established:

(1) Pressure drop due to flow=$P_1-P_2$;
(2) $P_2=P_3$+pressure drop due to flow+head; and
(3) Head=$P_2-P_3$—pressure drop due to flow=$(P_2-P_3)-(P_1-P_2)$, wherein $P_1$=pressure at the inlet end of the horizontal section 12;
$P_2$=pressure at the junction of the horizontal section 12 and vertical section 14; and
$P_3$=pressure at the outlet end of the vertical section 14.

Consequently, the pressure head due to the density of the fluid in the flow stream can be determined by measuring the pressure at three points. The density can be continuously determined with various arrangements.

The pressure, $P_1$, at the inlet end of the horizontal section 12 is applied through pressure line 16 to a differential pressure transmitter 18. The pressure, $P_2$, at the junction of the horizontal section 12 and the vertical section 14 is fed to the differential pressure transmitter 18 through pressure lines 19 and 20.

The pressure, $P_2$, at the junction of the horizontal section 12 and vertical section 14 is also fed to a differential pressure transmitter 22 through pressure lines 19 and 24. The pressure, $P_3$, at the outlet end of the vertical section 14 is fed to differential transmitter 22 through pressure line 26.

The differential transmitter 18 continuously transmits a fluid pressure proportional to $P_1-P_2$. The pressure transmitted from differential pressure transmitter 18 is applied to a differential pressure transmitter 28 through pressure line 30. Likewise, the differential pressure transmitter 22 continuously transmits a pressure which is proportional to $P_2-P_3$. The pressure transmitted from differential pressure transmitter 22 is fed to differential pressure transmitter 28 through pressure line 32.

The differential pressure transmitter 28 continuously transmits a pressure which is proportional to the difference between the pressure applied through line 32 and the pressure applied through line 30. The transmitter pressure from differential pressure transmitter 28 is applied to a pressure recorder 34 through pressure line 36.

Thus, the pressure applied to pressure recorder 34 is a function of the pressure head due to the density of the fluid in the flow stream. The pressure recorder can be calibrated to directly indicate the density. Also, since the head is a function of density and the density is a function of the oil-water mixture, if this new method and system is used with an oil-water flow stream, the pressure recorder is calibrated to be proportional to the per cent of oil or water in the mixture. This, in turn, provides a means for automatically and continuously determining the bottom sediment and water content of the oil-water flow stream.

In FIG. 2, like parts to parts in FIG. 1 are referred to by like numbers. In FIG. 2, the pressures at two points, $P_1$ and $P_2$, in section 12 are fed to differential pressure cell 18. Also, the pressures at two points, $P_3$ and $P_4$, in section 14 are fed to differential pressure cell 22. The pressures from points $P_1$ and $P_2$ are fed to cell 18 through lines 16 and 40, respectively. The pressures from points $P_3$ and $P_4$ are fed to cell 22 through lines 25 and 27, respectively. The remainder of the system is similar to and operates in the same manner as the system of FIG. 1. It can be shown that:

$$\text{Head}=(P_3-P_4)-(P_1-P_2)$$

I claim:

A system for continuously obtaining the density of a flowing liquid comprising: a conduit having a horizontal section followed by a vertical section of the same dimensions as said horizontal section; a first differential pressure transmitter; means for applying the pressure at the inlet end of the horizontal section to said first differential pressure transmitter; means for applying the pressure at the junction of the horizontal and vertical sections to said first differential pressure transmitter; a second differential pressure transmitter; means for applying the pressure at the junction of the horizontal and vertical sections to said second differential pressure transmitter; means for applying the pressure at the outlet end of the vertical section to said second differential pressure transmitter; a third differential pressure transmitter; means for applying the pressure output from the first differential pressure transmitter to the third differential pressure transmitter; means for applying the pressure output from the second differential pressure transmitter to the third differential pressure transmitter; and a pressure recorder for recording the pressure output from the third differential pressure transmitter.

(References on following page)

References Cited by the Examiner

UNITED STATES PATENTS

| | | | |
|---|---|---|---|
| 1,697,867 | 1/29 | Haultain | 73—438 |
| 2,287,027 | 6/42 | Cummins | 73—438 |
| 2,768,529 | 10/56 | Hagler | 73—438 |
| 2,959,053 | 11/60 | Klein | 73—438 X |

FOREIGN PATENTS 1,083,782  6/54  France.

RICHARD C. QUEISSER, *Primary Examiner.*

DAVID SCHONBERG, *Examiner.*